United States Patent [19]

Dillenbeck, III

[11] Patent Number: 5,613,558
[45] Date of Patent: Mar. 25, 1997

[54] METHOD FOR CONTROLLING THE SET TIME OF CEMENT

[75] Inventor: Robert L. Dillenbeck, III, Oklahoma City, Okla.

[73] Assignee: BJ Services Company, Houston, Tex.

[21] Appl. No.: 458,826

[22] Filed: Jun. 2, 1995

[51] Int. Cl.$^6$ .............................. E21B 33/13; E21B 33/14
[52] U.S. Cl. ..................... 166/293; 106/720; 106/725; 106/726; 106/727; 106/803; 166/292; 166/300
[58] Field of Search ........................ 166/292, 293, 166/300; 106/724, 725, 720, 727, 730, 803, 805, 726

[56] References Cited

U.S. PATENT DOCUMENTS

| | | | |
|---|---|---|---|
| 2,985,239 | 5/1961 | Shell | 166/293 |
| 3,503,768 | 3/1970 | Pervite | 106/730 |
| 3,662,830 | 5/1972 | Martin | 166/293 |
| 4,036,301 | 7/1977 | Powers et al. | 166/293 |
| 4,065,318 | 12/1977 | Detroit et al. | 166/293 X |
| 4,450,010 | 5/1984 | Burkhalter et al. | 166/293 X |
| 4,470,463 | 9/1984 | Holland | 166/293 |
| 4,632,186 | 12/1986 | Boncan et al. | 166/293 |
| 5,327,968 | 7/1994 | Onan et al. | 166/293 |
| 5,336,316 | 8/1994 | Dawson et al. | 106/724 |

*Primary Examiner*—George A. Suchfield
*Attorney, Agent, or Firm*—Arnold, White & Durkee

[57] ABSTRACT

An oil and gas well cementing composition and method are shown utilizing hydraulic cement, water a cement hydration retarder and an additive which is effective over a selected time period to degrade the retarder. The additive is a controlled release oxidizer which releases nascent oxygen over time to gradually oxidize the cement hydration retarder, thereby providing a single cement slurry design for cementing pipes for oil and gas wells where wide temperature differentials exist between the two ends of the pipe.

17 Claims, 1 Drawing Sheet

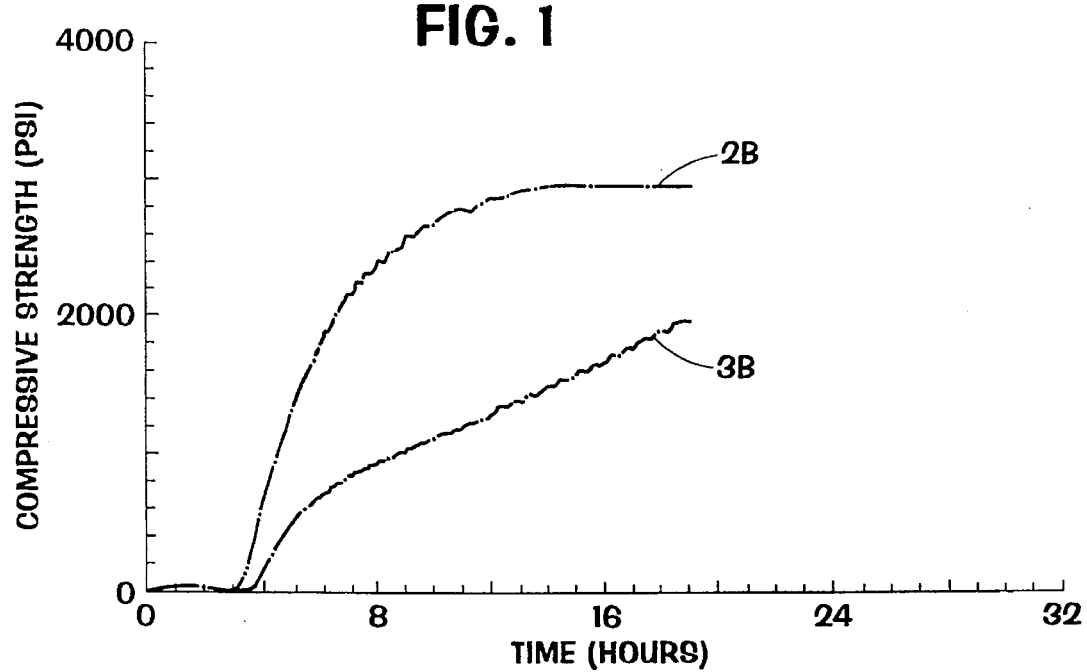
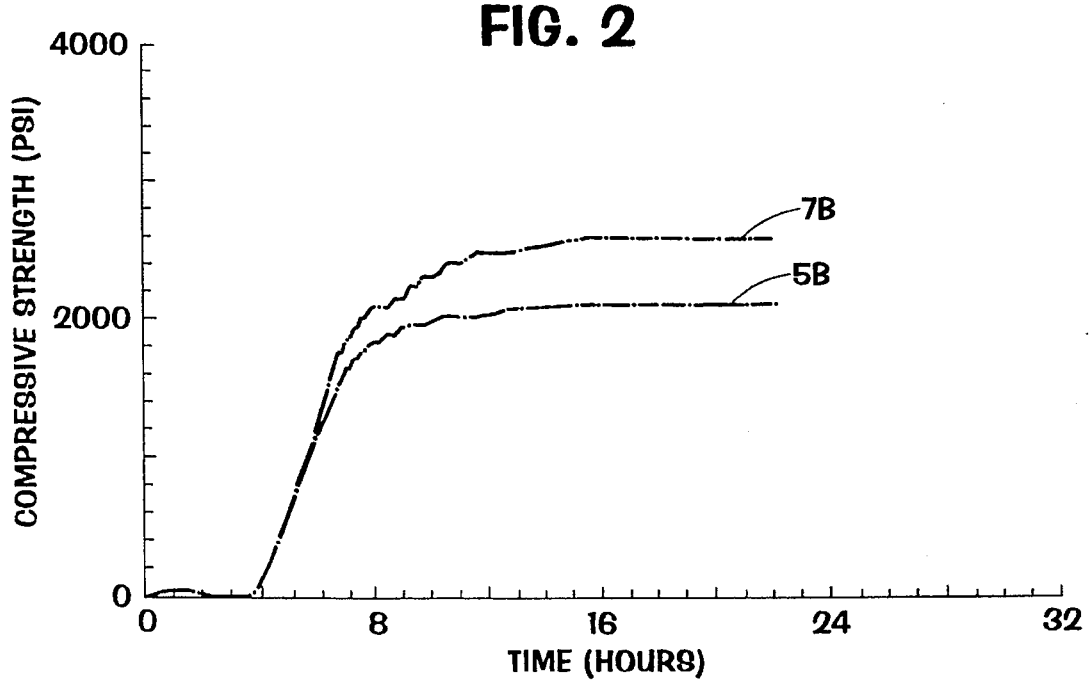

METHOD FOR CONTROLLING THE SET TIME OF CEMENT

BACKGROUND OF THE INVENTION

1. Field of the Invention:

The present invention relates to cementing compositions and methods for cementing oil and gas wells and, more specifically, to method and composition for cementing pipes for oil and gas wells where the pipes have opposing ends and the temperature differential between the two ends of the pipe within the well borehole is as much as 75° F., or more.

2. Description of the Prior Art:

Hydraulic cements are cements that can set under water. This setting property serves a variety of purposes. Hydraulic cements are often used in placement of pipes or casings within a well bore of a subterranean formation for the construction of oil and gas wells. In the oil and gas industry, successful cementing of well pipe and casing during oil and gas well completion requires cement slurries having several important properties. The slurry must have a pumpable viscosity, fluid loss control, minimized settling of particles and the ability to set within a practical time. Polymers, such as hydroxyethyl cellulose, carboxymethylhydroxyethyl cellulose, polyvinyl alcohol and polysulfonated polymers are commonly used to provide these important properties.

In a typical completion operation, the cement slurry is pumped down the inside of the pipe or casing and back up the outside of the pipe or casing through the annular space. This seals the subterranean zones in the formation and supports the casing. The amount of water used in forming the cement slurry depends upon the type of hydraulic cement selected and the job conditions at hand. The amount of water used can vary over a wide range, depending upon such factors as the required consistency of the slurry and upon the strength requirement for a particular job.

These completion procedures often place the hydraulic cement within or next to a porous medium, for example, earthern strata in the well bore. When this happens, water tends to filter out of the slurry and into the strata during placement and setting of the cement. Many difficulties relate to an uncontrolled fluid loss of this type, such as an uncontrolled setting rate, premature gelation of the slurry, bridging of the annular space between the formation and the casing, improper placement of the slurry, impaired strength properties and a contamination of the surrounding strata. These conditions are all undesirable in oil and gas well cementing operations. Special additives have consequently been designed to control fluid loss during well cementing operations.

To achieve a satisfactory primary cementing job, it is also important to achieve a tight bond between the pipe or casing and the cement sheath to prevent vertical communication of fluids or gas along or within the cement column. In order to achieve a tight bond, it is important to reduce the cement matrix permeability and retain water during the initial set, effectively blocking the porous cement structure.

In cementing certain long strings of pipe or casing, the temperature differential between the two ends of the pipe might be 75° F., or more. In such cases, a slurry design must be adequate to cement a pipe in a gas or oil well where the two ends of the pipe are, for example, at 310° F. and 235° F., respectively. One problem presented by such a wide temperature differential is that the slurry is required to remain in a pumpable state, for example, for two hours (job time plus safety time) at the lower, relatively high temperature zone (310° F. bottom hole circulating temperature, BHCT, in this example), and yet develop sufficient compressive strength at the upper, relatively low temperature zone (235° F. in this example) to minimize the rig time. For purposes of this example, the requirements are pumping time of about 2 hours 30 minutes±15 minutes at 310° F. BHCT and 16100 psi pressure at a 16150 foot depth, while developing a compressive strength of at least 200 psi in twelve hours. The slurry design must also be adequate to cement two such well zones at very wide temperature differentials through the use of a single slurry, rather than through the use of staged cement slurries.

Traditional API Class "H" cement systems would generally not be able to achieve these desired results for several reasons. Typical long strings of pipe of the type under consideration use slurries whose strength development can be somewhat slow, or even non-existent, when retarded for bottom hole conditions and cured at lower temperatures. Additionally, given the long exposure to annular conditions experienced by the lead portion of the cement column being pumped, fluid loss control is a necessity. Since many of the fluid loss additives tend to retard cement setting times and strength development (especially when loaded for bottom hole circulating temperature and then cured under surface conditions), the addition of fluid loss additives only serves to exaggerate the nature of the problem.

Thus, a need exists for an improved well cementing composition which provides a slurry having a pumpable viscosity, adequate fluid loss control, minimized settling of particles and the ability to set within a practical time and develop sufficient compressive strength, even where well zones at wide temperature differentials are being cemented.

A need also exits for such an improved cement composition which allows the transition from a hydrostatic pressure transmitting liquid to a set cement, with very little, if any, time spent in the plastic, self-supporting/gas-migrating stage.

SUMMARY OF THE INVENTION

The cementing method and compositions of the invention are used to cement well zones at a wide temperature differential, e.g. 75° F. or more, with a single slurry. The cementing compositions of the invention are comprised of hydraulic cement, water present in an amount sufficient to produce a pumpable slurry, a cement hydration retarder and an effective amount of an additive which serves to gradually oxidize the cement hydration retarder over a selected period of time, whereby destruction of the retarder serves to accelerate the setting process of the cement.

The cement hydration retarder can be any of a number of traditional retarders such as those selected from the group consisting of lignosulfonates, organic carboxylates and mixtures thereof.

The additive can be any controlled release oxidizer which does not otherwise detract from the desirable properties of the slurry which releases nascent oxygen over a selected period of time, the release of nascent oxygen serving to gradually oxidize the cement hydration retarder over the selected period of time. The controlled release oxidizer can be selected from the group consisting of alkaline earth and zinc salts of peroxide, perphosphate, perborate and percarbonate and mixtures thereof and can include, for example, calcium peroxide, calcium perphosphate, calcium perborate, magnesium peroxide, magnesium perphosphate and zinc perphosphate. The controlled release oxidizer can also include such oxidants as calcium hypochlorite, magnesium hypochlorite, chloramine T, trichloroisocyanuric acid, trichloromelamine, dichloroisocynaurate dihydrate, anhydrous dichloroisocynaurate and mixtures thereof. The controlled release oxidizer can also be an encapsulated oxidizer such as an encapsulated persulfate.

The cementing compositions of the invention can be used to cement a pipe within a well bore which has a top, relatively low temperature zone and a bottom, relatively high temperature zone and wherein the period of time over which the oxidizer releases nascent oxygen is selected to maintain the cementing slurry in a pumpable state for at least two hours at the relatively high temperature zone. The compositions of the invention are designed to develop a compressive strength of at least 200 psi in twelve hours at the top, relatively low temperature zone of the well bore. The compositions are pumped to the desired location in the well bore and allowed to harden to a solid mass.

Additional objects, features and advantages will be apparent in the written description which follows.

BRIEF DESCRIPTION OF THE DRAWINGS

FIG. 1 is a graph of compressive strength versus time which compares a prior art cement slurry with a slurry of the invention; and FIG. 2 is a graph of compressive strength versus time, similar to FIG. 1, which compares a different prior art slurry with a slurry of the invention.

DETAILED DESCRIPTION OF THE INVENTION

The invention relates to an improved cementing composition and the method of using the cementing composition. The cementing composition is composed of hydraulic cement, a cement hydration retarder, an additive comprising a controlled release oxidizer and water.

In this disclosure, the term "hydraulic cement" refers to any inorganic cement that hardens or sets with water. The term "hydraulic cement" also includes cements having minor amounts of extenders such as bentonite, gilsonite, and cements used either without any appreciable sand or aggregate material or such cements admixed with a granular filling material such as sand, ground limestone, fly ash, and the like. Hydraulic cements, for instance, include Portland cement, aluminous cements, pozzolan cements, and the like. Thus, for example, any of the class "A–H" and "J" cements as listed in the *API Spec* 10 *First Edition*, January 1982 are suitable for the invention. Strength enhancers such as silica powder can be employed as well.

Mixing water with the dry hydraulic cement compositions produces a slurry. A sufficient amount of water should be added to the hydraulic cement to form a pumpable slurry of suitable consistency. The water can be any type of water commonly used in the cement industry, such as fresh water, brines, sea water, and the like. The water can have additional additives present, for instance, potassium chloride, dispersants, accelerators, viscosifiers, retarders and accelerators. *API Spec* 10 *First Edition*, January 1982, which is known in the cement industry, describes an approved apparatus and method for measuring the consistency of cement slurries in terms of Bearden units of consistency (Bc). A pumpable slurry should measure in the range from about 2 to 20 Bc and preferably be in the range of about 5 to 11 Bc. Slurries thinner than 5 Bc tend to have greater particle settling and free water generation. Slurries thicker than about 11 Bc become increasingly difficult to pump.

Depending upon the particular slurry and intended conditions of use, the amount of mixing water in the slurry of the present invention ranges from about 30 to 150 weight percent based upon the dry weight of cement and preferably is in the range of about 35 to 90 weight percent.

The cementing compositions of the invention also preferably include an organic cement hydration retarder. Such retarders will be familiar to those skilled in the oil and gas well cementing industries. The most common retarders used are the lignosulfonates such as calcium and sodium lignosulfonate. Other retarders include lignin-liquid, carboxymethyl hydroxyethyl cellulose (CMHEC) and borax. The lignosulfonates are generally effective up to circulating temperatures of about 200° F. For higher temperatures, special retarder blends containing CMHEC, such as "DIACEL LWL," are effective for bottom hole circulating temperatures of 350° F., or higher.

Additionally, many traditional fluid loss additives, such as those containing CMHEC also act to retard the setting time of cement. For purposes of the present invention, the term "retarder" will be understood to encompass both traditional "retarders", such as the lignosulfonates, and traditional "fluid loss" additives which themselves retard, such as those containing CMHEC, hydroxyethyl cellulose (HEC) and AMPS copolymers (see, e.g., U.S. Pat. No. 4,632,186, issued Dec. 30, 1986, "Well Cementing Method Using An AM/AMPS Fluid Loss Additive Blend." The preferred retarders of the invention are the lignosulfonates and the retarders containing organic carboxylate functionalities, such as those containing CMHEC. The lignosulfonate and organic carboxylate retarders are generally present in the cementing compositions of the invention in the range from about 0.01 to 2.00% by weight, based on the weight of dry cement, most preferably in the range from about 0.10 to 1.50% by weight.

The cementing compositions of the invention also have incorporated therein an effective amount of an additive which serves to gradually oxidize the cement hydration retarder over a predetermined period of time, whereby destruction of the retarder serves to accelerate the setting process of the cement.

Preferably, the additive is a controlled release oxidizer which releases nascent oxygen over a selected period of time, the release of nascent oxygen serving to gradually oxidize the cement hydration retarder over the selected period of time. The controlled release effect can be achieved in different ways, including the use of a substantially insoluble oxidant instead of a coated soluble oxidant, e.g., a persulfate. Thus, the controlled release can be effected by selecting a suitable sparingly soluble or substantially insoluble material as the oxidizer, the solubility rate of the material serving to determine the rate at which more nascent oxygen enters the cement slurry to thereby degrade the retarder and/or fluid loss additive. Such controlled release oxidizers can be selected from the group consisting of alkaline earth and zinc salts of peroxide, perphosphate, perborate and percarbonate and mixtures thereof, and can include, for example, calcium peroxide, calcium perphosphate, calcium perborate, magnesium peroxide, magnesium perphosphate and zinc perphosphate.

The substantially insoluble oxidant is preferably selected from the group consisting of alkaline earth and zinc salts of peroxide, perphosphate, perborate and percarbonate. The rate of solubility is dependant upon several parameters such as the solubility product constant, the temperature of the surrounding formation, pH of the fluid and the surface area of the granules. Generally, suitable oxidants for purposes of the present invention will have a solubility of less than 1% by weight, such as 1 gram material/100 grams water.

Representative examples of the substantially insoluble oxidants of the invention include:

|  | Solubility in grams per 100 cc | | |
|---|---|---|---|
|  | Cold Water | Hot Water | Other Solvents |
| calcium peroxide $CaO_2$ | sl s | — | s a |
| calcium perphosphate $Ca_2P_2O_8$ | i | i | i a |
| calcium perborate $Ca(BO_3)_2$ | sl s | — | s a, $NH_4$ salts, sls ac a |
| magnesium peroxide $MgO_2$ | i | i | s a |
| magnesium perphosphate $Mg_2P_2O_8$ | i | i | s, $NH_4$ salts, i liq $NH_3$ |
| zinc perphosphate $Zn_2P_2O_8$ | i | i | s a, $NH_4OH$; i al | where
i = insoluble
sl s = slightly soluble
s a = soluble in acid
i a = insoluble in acid
sl s ac a = slightly soluble in acids and alcohol In terms of the above table, "substantially insoluble" will be taken to mean a compound of the above type having a solubility in cold and hot water of "i" or "sl s" as listed in the Handbook of Chemistry and Physics, 72nd Edition, CRC Press.

One particularly preferred control release oxidant is a calcium peroxide available commercially from FMC Corporation as "PERMEOX."

Although the above listed sparingly soluble or substantially insoluble oxidizers are adequate for practicing the present invention, other oxidants have been successfully used, as well, including such oxidants as calcium hypochlorite, magnesium hypochlorite, chloramine T, trichloroisocyanuric acid, trichloromelamine, dichloroisocynaurate dihydrate, anhydrous dichloroisocynaurate and mixtures thereof.

The controlled release oxidizer can also be an encapsulated oxidizer such as a coated persulfate of the type familiar to those skilled in the art. One such encapsulated oxidizing accelerator is described in issued U.S. Pat. No. 5,164,099, issued Nov. 17, 1992 to Cooney et al., now assigned to the assignee of the present invention, the disclosure of which is incorporated herein by reference. The Cooney patent describes an encapsulated "breaker" for fracturing fluids which can also be used for purposes of the present invention as a controlled release oxidizer for a cement slurry. A percarbonate, perchlorate or persulfate, such as calcium persulfate, is encapsulated with a polyamide membrane which is permeable to a fluid, in this case the water in the cement slurry, such that the persulfate diffuses through the membrane to act upon the cement hydration retarder to degrade the retarder with time. The encapsulated breaker is commercially available as the "ULTRA PERM CRB" breaker from BJ Services Company of Houston, Tex. The encapsulated oxidizer is preferably present in the range from about 0.01 to 5.0%, most preferably about 0.10 to 0.50% by weight, based upon the weight of dry cement.

The following non-limiting examples are illustrative of the invention.

In Table I which follows, slurries used in the evaluation of the controlled release oxidizer of the invention were mixed in a "WARING" blender, following Section 5 of API Spec 10. Procedures used to measure fluid parameters such as fluid loss (API FL), thickening time (TT) and rheology were obtained from API Spec 10 also.

The base slurry evaluated was a Joppa Class "H" oil field cement having blended therein 35% by weight of dry cement of "SF-3" (silica flour), 35% by weight of cement hematite (weighing material), 37.2% by weight of water (BWOW) of salt, 0.5% by weight of cement "CF-22" fluid loss additive (grafted AMPS-tannin copolymer), 0.10% by weight of cement "AF(S)" tributylphosphate defoamer, 0.10% by weight of cement "ASA 301" viscosifier and free water reducer. The ingredients were mixed with 44.2% by weight water and conditioned as described in API Spec 10. The slurry had a density of 18.8 pounds per gallon (ppg). In Table I which follows, thickening time was measured at 310° F., fluid loss at 180° F. and compressive strength was measured with "ULTRASONIC CEMENT ANALYZER" ("UCA") compressive strength (CS) at 235° F. "WR-15" is a medium to high temperature retarder containing approximately 70% silica flour, 15% sodium gluconate and 15% of a lignosulfonate organic acid blend commercially available from BJ Services Company, "WZ 499792" is the calcium peroxide controlled release oxidizer.

TABLE I

"WR-15"/PEROXIDE SYSTEM
Base Slurry: Joppa H + 35% "SF-3" + 35% HEMATITE + 37.2% Salt (BWOW) +
0.5% "CF-22" + 0.10% "AF(S)" + 0.10% "ASA 301" + 44.2% Water
D = 18.8 ppg; TT at 310° F.; FL loss at 180° F.; 2 at 235° F.

| Run | Date | % "WR-15" (BWOC) | % "WZ 499792" (BWOC) | TT (Hr:Min) | API FL Loss (ml/ 30 min) | Rheology (rpm) RT/180° F. | | | | | | UCA CS at 235° F. | | |
|---|---|---|---|---|---|---|---|---|---|---|---|---|---|---|
|  |  |  |  |  |  | 600 | 300 | 200 | 100 | 6 | 3 | 50 psi (Hr:Min) | 500 psi (Hr:Min) | Final PSI (Hr:Min) |
| 1 | 2/25 | 1.25 | 0.10 | 2:12 | 30 | 860/ 434 | 492/ 236 | 353/ 164 | 207/ 89 | 31/ 10 | 23/ 8 | 11:11 | 11:41 | 6378 (24:36) |
| 2 | 2/26 | 1.40 | 0.15 | 2:30 |  |  |  |  |  |  |  | 10:52 | 13:00 | 2978 (approx. 250 psi @ 12:00) |

TABLE I-continued

"WR-15"/PEROXIDE SYSTEM
Base Slurry: Joppa H + 35% "SF-3" + 35% HEMATITE + 37.2% Salt (BWOW) +
0.5% "CF-22" + 0.10% "AF(S)" + 0.10% "ASA 301" + 44.2% Water
D = 18.8 ppg; TT at 310° F.; FL loss at 180° F.; 2 at 235° F.

| Run | Date | % "WR-15" (BWOC) | % "WZ 499792" (BWOC) | TT (Hr:Min) | API FL Loss (ml/ 30 min) | Rheology (rpm) RT/180° F. | | | | | | UCA CS at 235° F. | | |
|---|---|---|---|---|---|---|---|---|---|---|---|---|---|---|
| | | | | | | 600 | 300 | 200 | 100 | 6 | 3 | 50 psi (Hr:Min) | 500 psi (Hr:Min) | Final PSI (Hr:Min) |
| 3 | 2/24 | 1.25 | — | 2:13 | | | | | | | | 21:00+ | | |
| 4 | 2/26 | 1.40 | 0.15 | 2:19 | 34 | 968/ 509 | 538/ 271 | 380/ 180 | 215/ 97 | 27/ 10 | 19/ 6 | 11:21 | 11:56 | 3013 (13:23) Free water - trace |
| 5 | 2/28 | 1.40 | 0.15 | 2:21 | 32 | 1037/ 343 | 622/ 188 | 457/ 129 | 265/ 70 | 46/ 8 | 35/ 6 | 10:04 | 11:10 | 8798 (32:54) Free water - 1.5 mL |
| 6 | 3/1 | 1.30 | 0.10 | 2:37 | 34 | 1037/ 438 | 572/ 223 | 392/ 150 | 219/ 77 | 27/ 8 | 15/ 4 | 8:15 | | Free water - 5 mLs |

As shown in Table I, the addition of the calcium peroxide controlled release oxidizer slowly releases nascent oxygen which oxidizes the lignosulfonate and organic carboxylates present in the WR-15 retarder over time to enhance the development of compressive strength, especially at the higher, relatively low temperature end of the pipe being cemented. The controlled release of the oxidizer also maintains the slurry's pumpable state for at least the desired two hours pumping time. This allows the almost complete destruction of the retarder within 3-4 hours, thereby accelerating the setting process and eliminating problems with "over-retarding" on jobs involving long strings of pipe with wide well bore temperature differentials, as was sometimes the case in the past. Note particularly Runs 1 and 3. The development of 50 psi compressive strength in Run 3, without the controlled release oxidizer, took twenty-one plus hours at 235° F. To develop the same 50 psi compressive strength took only eleven hours, eleven minutes at 235° F. with the oxidizer additive of the invention included in the same base slurry.

FIG. 1 is a graph of compressive strength versus time which was developed using an ultrasonic cement analyzer. Curve 3B represents a traditional slurry made with Holnam Class "H" cement, 35% S-8 (silica flour), 0.4% R-8 retarder (lignosulfonate and organic acid blend) and containing 50% water. Curve 2B is the same slurry but with the addition of 0.1% by weight of cement of calcium peroxide oxidizer. The temperature differential was from 270° F. BHCT/320 BHST to 250° F., where BHCT is bottom hole circulating temperature and BHST is bottom hole static temperature. The thickening time was 5 hours 58 minutes for Run 3B and 4 hours 55 minutes for Run 2B.

FIG. 2 is similar to FIG. 1 the slurries having the same ingredients but with a temperature differential of 270° F. BHCT/320 BHST to 230° F. Slurry 7B has added thereto 0.1% by weight of cement of calcium peroxide.

As can be seen from FIGS. 1 and 2, the addition of a controlled release oxidizer results in a markedly improved rate of strength development, once development has started.

In a method of using the cementing composition, a pumpable slurry is made by adding together hydraulic cement, water, a cement hydration retarder and the additive described above to formulate the cementing composition of the invention. The pumpable slurry is then pumped to a desired location within a well bore, where it is allowed to harden.

An invention has been provided with several advantages. The cementing compositions of the invention can be used to cement a pipe within a well bore which has a top, relatively low temperature zone and a bottom, relatively high temperature zone and wherein the period of time over which the oxidizer releases nascent oxygen is selected to maintain the cementing slurry in a pumpable state for at least two hours at the relatively high temperature zone. The compositions of the invention are designed to develop a compressive strength of at least 200 psi in twelve hours at the top, relatively low temperature zone of the well bore.

While the invention has been shown in only one of its forms, it is not thus limited but is susceptible to various changes and modifications without departing from the spirit thereof.

What is claimed is:

1. A method of cementing an oil and gas well, the method comprising the steps of:

forming a cementing slurry by combining dry hydraulic cement, water in a sufficient amount to produce a pumpable slurry, a cement hydration retarder and an additive comprising a controlled release oxidizer which is effective to slowly release nascent oxygen over a selected period of time;

pumping the cementing slurry to a desired location within the well bore; and allowing the cementing slurry to harden to a solid mass, the controlled release oxidizer serving to gradually oxidize the cement hydration retarder over the selected period of time.

2. The method of claim 1, wherein the cement hydration retarder is selected from the group consisting of lignosulfonates, organic carboxylates and mixtures thereof.

3. The method of claim 1, wherein the controlled release oxidizer is selected from the group consisting of alkaline earth and zinc salts of peroxide, perphosphate, perborate, percarbonate and mixtures thereof.

4. The method of claim 1, wherein the controlled release oxidizer is an encapsulated oxidizer.

5. The method of claim 1, wherein the controlled release oxidizer is selected from the group consisting of:

calcium peroxide, calcium perphosphate, calcium perborate, magnesium peroxide, magnesium perphosphate, zinc perphosphate and mixtures thereof.

6. The method of claim 1, wherein the controlled release oxidizer is selected from the group consisting of calcium hypochlorite, magnesium hypochlorite, chloramine T, trichloroisocyanuric acid, trichloromelamine, dichloroisocynaurate dihydrate, anhydrous dichloroisocynaurate and mixtures thereof.

7. The method of claim 1, wherein the cement hydration retarder is a traditional fluid loss additive having a hydroxyl or carboxylate functionality.

8. The method of claim 7, wherein the fluid loss additive is selected from the group consisting of carboxymethylhydroxyethyl cellulose, hydroxyethyl cellulose, AMPS copolymers, and mixtures thereof.

9. The method of claim 1, wherein the cementing slurry is used to cement a pipe within a well bore which has a top, relatively low temperature zone and a bottom, relatively high temperature zone and wherein the period of time over which the oxidizer releases nascent oxygen is selected to maintain the cementing slurry in a pumpable state for at least two hours at the relatively high temperature zone.

10. The method of claim 9, wherein the cementing slurry is designed to develop a compressive strength of at least 200 psi in twelve hours at the top, relatively low temperature zone of the well bore.

11. A method of cementing a pipe having opposing pipe ends within a well bore of an oil and gas well where a large temperature differential exists in the well bore adjacent the opposing pipe ends, the method comprising the steps of:

forming a cementing slurry by combining dry hydraulic cement, water in a sufficient amount to produce a pumpable slurry, a cement hydration retarder and an additive comprising a controlled release oxidizer which is effective to slowly release nascent oxygen over a selected period of time;

pumping the cementing slurry within an annular area created between the pipe and the surrounding well bore; and allowing the cementing slurry to harden to a solid mass, the controlled release oxidizer serving to gradually oxidize the cement hydration retarder over the selected period of time, whereby destruction of the retarder serves to accelerate the setting process of the cement.

12. The method of claim 11, wherein the temperature differential between the two ends of the pipe within the well borehole is at least 75° F.

13. The method of claim 11, wherein the cement hydration retarder is selected from the group consisting of lignosulfonates, organic carboxylates and mixtures thereof.

14. The method of claim 11, wherein the controlled release oxidizer is selected from the group consisting of alkaline earth and zinc salts of peroxide, perphosphate, perborate and percarbonate.

15. The method of claim 11, wherein the controlled release oxidizer is an encapsulated oxidizer.

16. The method of claim 11, wherein the controlled release oxidizer is selected from the group consisting of:

calcium peroxide, calcium perphosphate, calcium perborate, magnesium peroxide, magnesium perphosphate, zinc perphosphate and mixtures thereof.

17. The method of claim 11, wherein the controlled release oxidizer is selected from the group consisting of calcium hypochlorite, magnesium hypochlorite, chloramine T, trichloroisocyanuric acid, trichloromelamine, dichloroisocynaurate dihydrate, anhydrous dichloroisocynaurate and mixtures thereof.

* * * * *

UNITED STATES PATENT AND TRADEMARK OFFICE
CERTIFICATE OF CORRECTION

PATENT NO. : 5,613,558
DATED : March 25, 1997
INVENTOR(S) : Robert L. Dillenbeck, III It is certified that error appears in the above-identified patent and that said Letters Patent is hereby corrected as shown below:

columns 6 and 7 at Table I, line 5, please delete the "2" after "FL loss at 180° F;" and before "at 235° F" and substitute the words --Ultrasonic Cement Analyzer (UCA) compressive strength-- therefor.

Signed and Sealed this

Second Day of December, 1997

Attest:

BRUCE LEHMAN

*Attesting Officer*    Commissioner of Patents and Trademarks